US012767566B2

(12) United States Patent
Swogger et al.

(10) Patent No.: US 12,767,566 B2
(45) Date of Patent: Oct. 20, 2026

(54) METHODS OF TREATING WASTE STREAMS

(71) Applicant: U.S. Clean Water Technology, Inc., Austin, TX (US)

(72) Inventors: Kurt W. Swogger, Austin, TX (US); John Richard Graves, Austin, TX (US); Philip J. Carlberg, Austin, TX (US)

(73) Assignee: U.S. Clean Water Technology, Inc., Austin, TX (US)

( * ) Notice: Subject to any disclaimer, the term of this patent is extended or adjusted under 35 U.S.C. 154(b) by 0 days.

(21) Appl. No.: 19/380,781

(22) Filed: Nov. 5, 2025

(65) Prior Publication Data

US 2026/0062322 A1 Mar. 5, 2026

Related U.S. Application Data

(63) Continuation-in-part of application No. 18/957,190, filed on Nov. 22, 2024, now Pat. No. 12,540,093, and
(Continued)

(51) Int. Cl.
C02F 1/46 (2023.01)
C02F 1/40 (2023.01)
(Continued)

(52) U.S. Cl.
CPC ................ C02F 1/463 (2013.01); C02F 1/40 (2013.01); C02F 1/46109 (2013.01);
(Continued)

(58) Field of Classification Search
CPC ........ C02F 1/463; C02F 1/40; C02F 1/46109; C02F 2001/46119; C02F 2001/46138;
(Continued)

(56) References Cited

U.S. PATENT DOCUMENTS

2013/0206606 A1* 8/2013 Gilliam .................. C25B 15/08 204/242
2014/0263094 A1 9/2014 Quicksall
(Continued)

FOREIGN PATENT DOCUMENTS

WO 2012151617 11/2012

OTHER PUBLICATIONS

Frank Barranco, "Tangible Benefits of Thermally Treating PFAS-Impacted Materials", EA Engineering, Science and Technology, Inc., https://eaest.com/insight/tangible-benefits-of-thermally-treating-pfas-impacted-materials/.
(Continued)

*Primary Examiner* — Zulmariam Mendez
(74) *Attorney, Agent, or Firm* — HUNTON ANDREWS KURTH LLP

(57) ABSTRACT

Processes for removing oil and other organics especially lipids from process steams comprising lipids, brown grease, and water is disclosed and a process to remove metals and organics from leachate from landfills and other waste sites that generate contaminated water streams. The processes may involve adjusting pH and using electrical fields generated by a device comprising electrodes to induce gas bubbles. The gas bubbles facilitate movement toward the surface of the solution where they may be skimmed off and recovered. Processes are also described that upgrade brown grease to usable precursors for make beneficial products such as jet fuel. Other processes described herein include removal of carbon char from pyrolysis products like tires, plastics, rubbers, municipal solid waste, and oil or sewage sludge.

16 Claims, 1 Drawing Sheet

Related U.S. Application Data a continuation of application No. 16/781,676, filed on Feb. 4, 2020.

(60) Provisional application No. 63/602,279, filed on Nov. 22, 2023, provisional application No. 62/801,052, filed on Feb. 4, 2019.

(51) Int. Cl.
*C02F 1/461* (2023.01)
*C02F 1/463* (2023.01)
*C02F 101/32* (2006.01)

(52) U.S. Cl.
CPC ............... *C02F 2001/46119* (2013.01); *C02F 2001/46138* (2013.01); *C02F 2001/46171* (2013.01); *C02F 2101/32* (2013.01); *C02F 2201/4611* (2013.01); *C02F 2201/4617* (2013.01)

(58) Field of Classification Search
CPC ........ C02F 2001/46171; C02F 2101/32; C02F 2201/4611; C02F 2201/4617
See application file for complete search history.

(56) References Cited

U.S. PATENT DOCUMENTS

| | | | |
|---|---|---|---|
| 2015/0166383 | A1 | 6/2015 | Visnja et al. |
| 2015/0203375 | A1 | 7/2015 | Green |
| 2017/0081219 | A1 | 3/2017 | Taylor |
| 2020/0399147 | A1 | 12/2020 | Yost |

OTHER PUBLICATIONS

Bamdad, H.; Papari, S.; Moreside, E.; Berruti, F. High-Temperature Pyrolysis for Elimination of Per- and Polyfluoroalkyl Substances (PFAS) from Biosolids. Processes 2022, 10, 2187. https://doi.org/10.3390/pr10112187.

"Application of Supercritical Water Oxidation to Effectively Destroy Per- and Polyfluoroalkyl Substances in Aqueous Matrices", Christopher G Scheitlin, Kavitha Dasu, Stephen Rosansky, Lindy Espina Dejarme, Dinusha Siriwardena, Jonathan Thorn, Larry Mullins, Ian Haggerty, Krenar Shqau, and Julia Stowe, ACS ES&T Water 2023 3 (8), 2053-2062, DOI: 10.1021/acsestwater.2c00548.

* cited by examiner

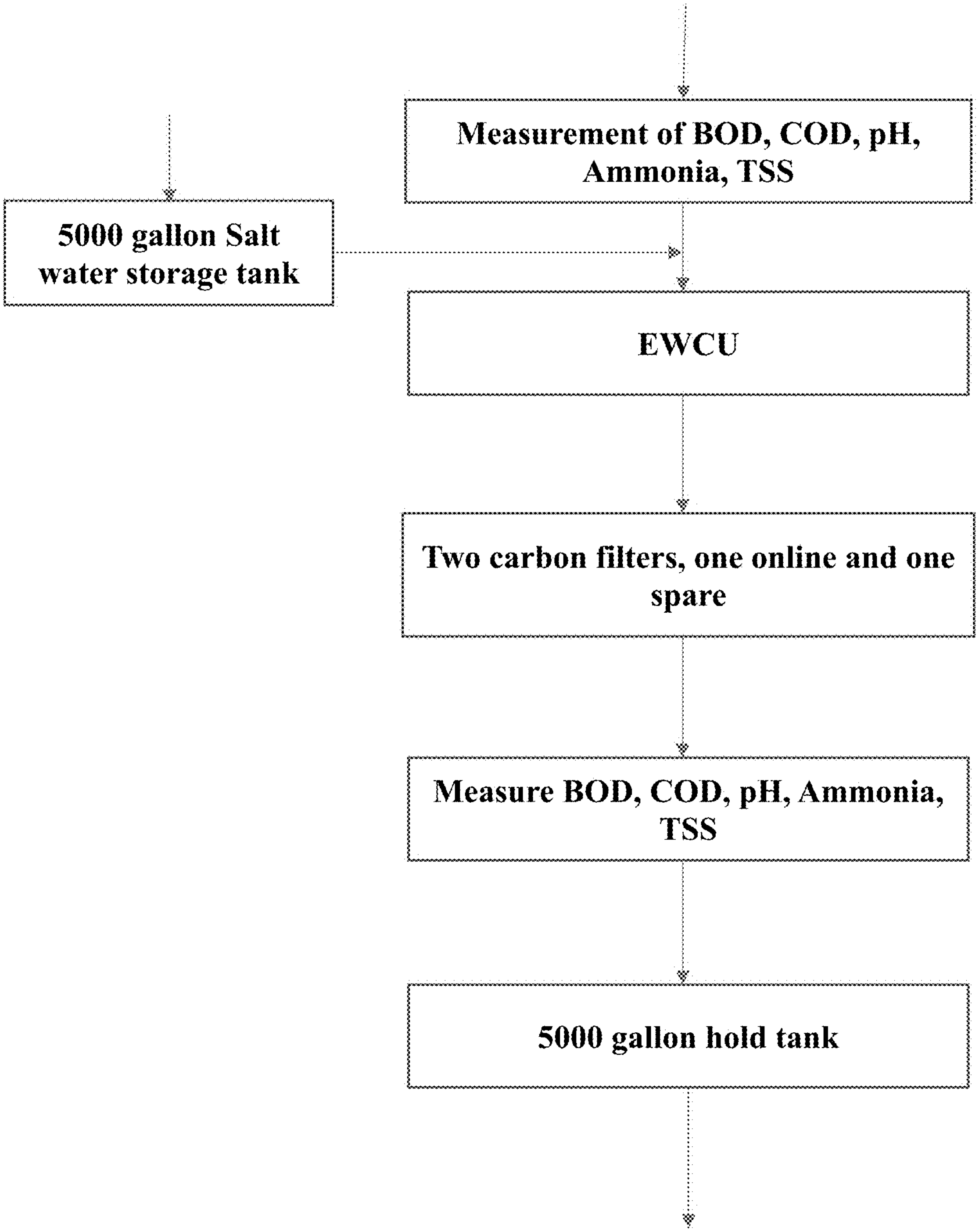
Measurement of BOD, COD, pH, Ammonia, TSS
5000 gallon Salt water storage tank
EWCU
Two carbon filters, one online and one spare
Measure BOD, COD, pH, Ammonia, TSS
5000 gallon hold tank

METHODS OF TREATING WASTE STREAMS

CROSS-REFERENCE TO RELATED APPLICATIONS

This application is a continuation-in-part of U.S. application Ser. No. 18/957,190 filed on Nov. 22, 2024 which application claims priority to U.S. Provisional Application No. 63/602,279 filed on Nov. 22, 2023, both of which applications are incorporated herein by reference. The application also claims priority to pending U.S. application Ser. No. 16/781,676 filed on Sep. 10, 2020 which application claims priority to U.S. Provisional Application No. 62/801,052 filed on Feb. 4, 2019, both of which applications are incorporated herein by reference. This application is also related to U.S. Pat. Nos. 9,896,355 and 10,968,119, the disclosures of which are incorporated herein by reference.

FIELD OF THE INVENTION

A water treatment device and process to remove one or more wastes from one or more aqueous streams using low energy processes.

BACKGROUND AND SUMMARY

The process flow to remove lipids such as found in brown grease, yellow grease, gums and other fatty and oil process streams (sometimes in industry or other groups referred to as FOG—fats, oils or grease) both soluble and insoluble from aqueous solution and emulsions involves acidification and subsequent removal by a device using electromagnetic fields. Lipids are a broad group of organic compounds which include fats, waxes, sterols, fat-soluble vitamins, monoglycerides, diglycerides, phospholipids, and others that are insoluble in water. As used herein, the lipid process stream may be referred to as lipids or as the lipid stream. The initial process stream is typically adjusted to pH less than 7. The pH adjusted initial process stream can optionally flow to a decanting device (or other separation method or device) that separates insoluble lipids from the remainder of the initial process stream. The process stream is then usually flowed to a device that causes separation and/or oxidation of the lipids or its salts. In some embodiments, a useful device comprises of parallel plates of titanium alternating with titanium plates coated with ruthenium oxide, iridium oxide, and/or combinations of ruthenium oxide and iridium oxide contained in a tank or other suitable container which may vary depending upon the application. The plates, when connected to direct electric current act to create electromagnetic fields sufficient to coalesce emulsion(s) of the lipids that then can be skimmed and which plates create peroxides or hydroxides or other reactive oxygen species that may be useful to oxidize any soluble organics.

In a first aspect, the invention is a process to recover lipids from an aqueous stream comprising lipids comprising the steps, optionally sequential steps, of: optionally heating the aqueous stream comprising lipids to reduce viscosity and/or release lipids from an aqueous phase;

a) adjusting the pH of the lipids with an aqueous diluent or other means,
b) optionally adding a hydrocarbon diluent,
c) treating the lipid derivative in aqueous diluent with an electrical field such that the lipid derivative coalesces into larger droplets and, d) recovering the larger droplets, thereby removing at least 50% of the lipid derivative from the aqueous stream,
e) oxidizing any soluble forms of the lipids or any other organics by hydroxy and peroxide groups or other reactive oxygen species,
f) which are formed by an electric field generated by application of an electric current and use of Titanium comprising an electrode and by the use of coatings of ruthenium oxide or iridium oxide or combinations thereof applied to titanium electrodes.

Optionally, and preferably, a decanting step may be employed in, for example, a pretreatment module after step (a) in the first aspect above. After addition of the aqueous diluent stream, preferably comprising at least one acid, comprising alkaline soaps of acid oils, including Fats, Oils, Grease, ester acid oils and Lipids oil, the process stream is separated into an aqueous stream still containing some acid and an acid oil stream. The aqueous stream is then pumped to a decanting device (such as a decanter or centrifuge) to remove coagulated oil and then pumped to the electromagnetic or electrical field generating device. The aqueous stream may optionally be heated to 721-2000 degrees F. The resulting coagulated acid oil is then recovered.

The terms aqueous stream and aqueous diluent stream can be used interchangeably.

Step (e) above can have a pH adjusted to from about 1 to about 6 in some embodiments.

The electrical field of step (c) can generate hydrogen gas bubbles which attach to the Lipids in some embodiments.

The aqueous diluent stream of step (a) can have a pH of about 6 or less, preferably 5 or less, more preferably 4 or less in some embodiments.

The voltage of the electric field can be at least 1 V, 10 V. 100 V. kV. The maximum Voltage of the electric field is usually less than 100 V.

The average amperage of the electric field can be at least 1 amp, at least 50 amps, or even at least 100 amps. According to at least some embodiments, the maximum amps can be less than 200 amps, less than 100 amps, less than 50 amps, or less than 10 amps.

The lipid can further comprise aqueous soluble organic compounds.

The soluble organic compounds can be at least 70% oxidized, preferably at least 80% oxidized, more preferably at least 90% oxidized, most preferably at least 98% oxidized.

Another embodiment of the invention is a process to produce water comprising less than 10,000 ppm organic lipids, more preferably less than 1000 ppm, most preferably less than 100 ppm from a lipids-containing emulsion stream. Such processes may comprise the sequential steps of.

a) adjusting the pH of the lipids with a first aqueous diluent,
b) optionally adding a hydrocarbon diluent,
c) treating the lipids in the aqueous diluent with an electrical field such that at least a portion up to all or substantially all of the lipids coalesce to form larger droplets and,
d) recovering the larger droplets, thereby typically removing at least 50% of the lipids based on the total mass of lipids from the lipids containing emulsion stream. Optionally, and preferably, a decanting step is inserted in, for example, a pretreatment or other module after step (a) in the first aspect above. After addition of the aqueous diluent stream, preferably comprising at least one acid, comprising alkaline soaps of acid oils, including fats, oils, grease, ester acid oils, and/or lipids oil, the process stream is separated into an aqueous stream (which often may still contain some acid oil) and an acid oil stream. The aqueous stream is then pumped to a separation device, e.g., decanting device (such as a decanter or centrifuge) to remove coagulated acid oil and then pumped to the electro-magnetic or electrical field generating device. The resulting coagulated acid oil is then recovered by any convenient method. The first aqueous diluent stream of step (a) can have a pH of about 6 or less, preferably 5 or less. The aqueous diluent of step (a) can be a mineral acid such as sulfuric acid, hydrochloric acid and the like or an organic acid such as acetic acid or citric acid or any combination of acids.

The electrical field of step (c) can generate hydrogen gas bubbles which attach to the lipids and aid in lowering density to aid bubbling of the attached lipids to the surface where they may be skimmed or removed in another convenient manner.

The voltage of the electric field can be at least 5 V, or at least 10 V or even at least 100 V. The maximum Voltage of the electric field can usually be less than 110V, or less than 20V, or preferably less than 12 V.

The average amperage of the electric field can be at least 1 amp, or at least 50 amps, or even at least 100 amps. According to at least some embodiments, the maximum amps can be less than 200 amps, or less than 100 amps, or less than 50 amps, or less than 10 amps.

The pH adjusted lipids of step (a) can further comprise aqueous soluble organic compounds. The soluble organic compounds can be at least 70% oxidized, preferably at least 80% oxidized, more preferably at least 90% oxidized, most preferably at least 98% oxidized.

BRIEF DESCRIPTION OF THE DRAWINGS

FIG. 1 shows a block flow diagram of a representative lipid removal process.

DETAILED DESCRIPTION OF THE INVENTION

A primary objective of this device called an Electric Water Cleaning Unit (EWCU) is to provide an expandable waste water treatment system which involves a series of module sections in which can be assembled or where sections can be removed to form a waste water treatment system. This system comprises a series of contaminate collection chambers which attach to both ends of a main treatment module(s) or a single contaminate collection chamber in the middle of the treatment module. The main treatment module(s) houses a preferred electro chemistry method using both ion donating and mixed metal oxide anodes and cathodes. However, the present invention should not be considered, limited or interpreted as merely electro chemistry function performed inside tanks, but where more consideration should be placed on the utility of an expandable assembly utilized for fluid treatment. Other methods such as aeration or chemical dosing can be performed. In the main treatment module(s) a fluid process may use substantially constant flow while working in tandem with chemical mixing for a pre- or post-treatment of a fluid. The process influent slated for treatment can be introduced into the system in continuous flow and where this influent is used as an electrolyte for electrical conductively between an anode and cathode array. Once DC voltage is applied to the array, micro bubbles of hydrogen and oxygen are produced, and once these bubbles generate and release from the anode and cathode arrays, they begin rising through the water column and attach to contaminate flocculation's to allow faster separation of the oil such as lipids from the aqueous stream. Once the oil reaches the surface of the module, they can be skimmed by a surface skimming device and deposited into either the beginning, center or ending contaminate collection chambers.

Electro-Coagulation is an electrochemistry method used to coagulate wastewater contaminates for ease of separation and collection from the wastewater stream. Wastewater when exposed to a controlled electrical field allows microscopic solids to attract, (like magnetism) forming higher concentrations of solids for greater removal efficiencies.

Selective material types or coatings applied to the anodes and cathodes provide several unique abilities in utilizing half redox ion reactions which can enhance the fluid treatment process. Mixed Metal Oxidizes, (MMO) typically used are non-donors of ions to the influent and where based on the type of MMO's selected, certain electrochemistry reactions can occur. For example, if combining titanium anodes with a ruthenium oxide or a ruthenium/iridium oxide coated cathode and if the influent contains salinity, chlorine is evolved which can be used to dis-infect the effluent. The electromagnetic field created by the selected materials used in the electrodes creates hydroxyl and peroxide ions or other reactive oxygen species that can be made more effective by improving mass transfer by rocking, vibrating or shaking the electrodes improving the oxidation by at least 1% and as high as at least 50%.

The oxidation is increased by at least 1% and as much as 150% with 170 Hz mechanical vibration and as much as 90% with 45 kHz ultrasonic agitation compared to stationary electrodes with no rocking, vibrating or shaking.

Salt removal is only needed if the water has unacceptable salt concentrations. The water should be cooled to less than 70 degrees F, preferably below 50 degrees F to allow proper operation for the next step, salt removal. The organic materials are generally removed to a level of less than 1% prior to salt removal to permit efficient salt removal.

Example 1

A 1 weight percent solution of glycerine in deionized water was used to demonstrate the effect of agitation on the oxidation of organic compounds. As the glycerin oxidizes it reacts to form smaller and smaller molecules. Carbon Oxygen Demand (COD) provides a measure of the organic content of the solution. By measuring COD during an oxidation reaction one can track the disappearance of the organic compounds with time and thereby quantify oxidation under different agitation conditions.

For each experiment 450 ml of the glycerin solution were placed in a 500 ml glass beaker. NaCl was added to make a 1 weight percent NaCl solution by weight. The NaCl was used for the solution to be electrically conductive. MMO and titanium electrodes, separated by 0.25 inches were inserted into the solution and DC power was established to the electrodes. The voltage was controlled so that current flow between the electrodes was steady at 10 amps. The decrease in COD level of the solutions was determined after 60 minutes.

Experiment 1—no agitation, rocking or vibration, COD reduction 2230 ppm

Experiment 2—beaker placed in ultrasonic bath@45 kHz, COD reduction 4180 ppm

Experiment 3—mechanical vibration of electrodes@200 Hz, COD reduction 5775 ppm

Compared to Experiment 1, oxidation was improved in Experiment 2 by 90%, and in Experiment 3 by 160%.

The combination of the organic removal unit, cooling unit and the salt removal unit is a unique and novel combination allowing for cleanup and reuse of waste from oil production allowing oil recovery, water recycle, salt recycle and potable water production.

Example 2

Test Summary:

1. The untreated aqueous FOG sample comprising lipids was warmed to ~27 C.
2. The untreated aqueous FOG sample comprising lipids was acidulated using sulfuric acid (this test was run with hydrochloric acid with the same results) to a pH of 3.5.
3. The lipid phase was decanted from the aqueous phase and measured to be 13% of the sample.
4. The aqueous phase was emulsified (cloudy).
5. The aqueous phase was treated with an electromagnetic feed using aluminum electrodes for 5 minutes.
6. The aqueous phase was then treated with an electromagnetic field with Ti and Ti coated with mixed metals (ruthenium and iridium oxides) at 7 volts. The emulsion broke at about 15 minutes after the two treatments.
7. After acidulating and decanting off 15-20% FOG. As can be seen, emulsion was broken in just over 15 minutes.
8. The total amount of Fog removed was 15% including decantation and EMF treatments.

Brown grease is a byproduct which is often collected from, for example, grease traps in commercial kitchens, restaurants, wastewater treatment facilities, and other sources. Brown grease may comprise fats, oils, and greases that are not suitable for processing into higher grade products, such as, for example, jet fuel, biodiesel, renewable diesel, lubricants, yellow grease, soaps, animal feed, or chemical feedstocks. That is, brown grease contains a wide range of impurities, i.e., contaminants, which typically must be reduced or eliminated to make it suitable for use into one or more higher grade products. The instant processes may reduce and/or substantially eliminate a number of impurities and therefor allow the cleaner brown grease to be employed for one or more of the aforementioned applications.

The processes described herein may remove or reduce the amounts of one or more up to all of the following: water (50% or more), food particles such as organic solids, inorganic solids such as sand, grit, dirt, plastics, paper, or other particulate matter from kitchen wastewater, detergents or other cleaning chemicals, metals (e.g., iron, aluminum, or zinc), bacteria and other microorganisms from decomposing organic matter in grease traps, free fatty acids from degradation or hydrolysis, difficult to separate emulsified oils, and salts include sodium and potassium salts.

The processes employed to make brown grease suitable for one or more of the other aforementioned applications such as jet fuel processing include at least some of the steps described above for treating leachates or recovering lipids. While treating leachates generally employs adjusting salt concentration, treating brown grease generally does not require such a step. Typically, the brown grease treatment begins with separating the water from the oil in the brown grease so that the water that often has the bulk of the contaminants from the brown grease may be treated.

Separating water from the oil may be conducted in any convenient manner and is not particularly limited. For example, the separating may comprise centrifuging, gravity separation, membrane separation, or any combination thereof. In some embodiments, the separating occurs outside of the tank or unit in which the electric field is employed. In other embodiments the separating may occur in the same tank or unit wherein the electric field is employed.

For example, the separating water may comprise introducing the brown grease comprising oil and water into an EWCU capable of producing an electric field and then then floating the oil off from the water to remove the oil from the EWCU. In some embodiments additional water may be added to dilute the oil to facilitate flow and/or treatment. It may be desirable to heat the brown grease to reduce its viscosity and increase its flowability. For example, the brown grease may be heated prior to separating to a temperature of from about 35 to about 65 °C to reduce the viscosity of the brown grease prior to introducing the brown grease comprising oil and water into the EWCU.

In some embodiments, it is useful to filter the brown grease comprising oil and water prior to and/or during the separating. The filtering may be conducted in any useful manner so long as it sufficiently removes solids such that subsequent treatment steps may be adequately performed. Such solids to be removed, as described above, include, for example, food particles such as organic solids, inorganic solids such as sand, grit, dirt, plastics, paper, or other particulate matter from kitchen wastewater.

Once the oil has been separated from the water it may be remedially cleaned if/as needed and then employed to make a useful product such as a jet fuel, a biodiesel, a renewable diesel, a lubricant, a yellow grease, a soap, an animal feed, or a chemical feedstock.

Once the water has been removed from the oil in the brown grease it may be treated to reduce and/or eliminate metals, if and as desired. Of course, in some embodiments the metals may be treated while the oil and water are in the brown grease. Typically, the separated water (or water combined with oil) is treated for metals by precipitating metals. In this manner, a reduced metal separated water or reduced metal brown grease is formed.

The specific manner of precipitating is not particularly critical so long as the undesired metals are removed in adequate amounts for further processing and/or ultimate desired cleaning of the water. In some embodiments precipitating metals comprises treating the water with an acid such the metals to be precipitated dissolve and then neutralizing the acid-treated water such that the metals precipitate. The acid may comprise any weak or strong acid, preferably a relatively weak acid such as sulfuric acid or acetic acid. The neutralizing may comprises treating the acid-treated water with a base sufficient to raise the acid-treated water to a pH of from about 8 up to about 10, or up to about 9.

Generally, the next step involves employing an electric field. The electric field may be employed at the voltages, amperages, and manner as described above for leachate treatment and adjusted as needed depending upon the particular water from brown grease to be treated and its components. The reduced metal water is treated with an electric field and then a carbon bed (or vice versa) as necessary to clean the water to desired limits. In some case the carbon bed conditions are set to remove or reduce at least a portion of BOD in order to prevent, for example, harming aquatic life or other deleterious effects caused by large amounts of dissolved oxygen being needed by aerobic biological organisms to break down organic matter. Lastly, the water may be treated, if/as necessary, to oxidize at least a portion up to all hydrocarbon based compounds present. In this manner, the water from the brown grease may be such that it can be treated in a municipal waste facility. That is, metals, ammonia, bacteria, organics, hydrocarbon organics, and/or other impurities come close to, meet, or exceed the requirements to be treated as municipal waste.

Representative Brown Grease Embodiments

1. A process for treating a lipid such as brown grease comprising oil and water, wherein the process comprises:

a) heating the lipid stream to help release the lipids from Aqueous phase;

b) adjusting the pH to and acidic condition;

c) optionally decanting a lipid containing phase from the aqueous phase d) optionally treat the lipid stream or the aqueous stream with aluminum ions released by electromagnetic field reaction of an aluminum rod acting as an electrode.

e) treating the lipid process stream or the aqueous stream using an electrode system powered by electricity applied to a titanium and a ruthenium oxide coated titanium electrode system F) attaching hydrogen bubbles to the lipid droplets assisting them to float to the surface subsequently skimmed into a lipid recovery chamber;

g) oxidizing metal, living organism, organic materials, BOD and COD using peroxides and hyperoxides generated by the electrode system; h) separating the lipid and aqueous phases in the EWCU i) adjusting the pH to a basic state to convert the metals to metal oxides which are water insoluble j) filtering the metal oxides and organic matter 2. The process of claim 1 which further comprises converting the separated oil to a useful product.

3. The process of claim 2 wherein the useful product comprises a jet fuel, a biodiesel, a renewable diesel, a lubricant, a yellow grease, a soap, an animal feed, or a chemical feedstock.

What is claimed is:

1. A process for treating a lipid stream comprising one or more lipids and water, wherein the process comprises:

a) heating the lipid stream to release the one or more lipids from the water and forming an aqueous phase comprising water and an oil phase comprising the one or more lipids;

b) decreasing the pH to dissolve at least a portion of one or more metals present;

c) optionally decanting at least a portion of the one or more lipids;

d) optionally treating the oil phase, the aqueous phase, or both with aluminum ions released by electromagnetic field reaction of an aluminum rod acting as an electrode operating at greater than 4 volts and less than 20 volts;

e) treating the oil phase, the aqueous phase, or both with an electrode system wherein the electrode system comprises a titanium and a ruthenium oxide coated titanium electrode system operating at greater than 1 volt up to 50 volts;

f) attaching hydrogen bubbles to at least a portion of the one or lipids such that the hydrogen attached lipids surface;

g) generating peroxides, hyperoxides, or a combination thereof to oxidize one or more oxidizable components comprising metal, living organisms, organic materials, BOD, COD, or any combination thereof;

h) separating the oil phase from the aqueous phase;

i) increasing the pH to precipitate at least a portion of the metals while avoiding substantial mount of emulsion formation; and j) filtering solids comprising metal precipitates, organic matter, or any combination thereof.

2. The process of claim 1 wherein the lipid stream comprises brown grease.

3. The process of claim 1 wherein the lipid stream is heated to from about to about 90 C.

4. The process of claim 1 wherein the pH is decreased to less than about 6 to dissolve at least a portion of one or more metals present.

5. The process of claim 1 wherein the aluminum ions are generated by an electromagnetic field reaction of an aluminum rod acting as an electrode wherein the electrode is operated at greater than about 4 volts and less than about 20 volts.

6. The process of claim 1 which further comprises skimming the surfaced, hydrogen attached lipids into a lipid recovery chamber.

7. The process of claim 1 wherein the peroxides, hyperoxides, or a combination thereof are generated using an electrode system.

8. The process of claim 1 wherein the pH to precipitate at least a portion of the metals is a pH of from greater than 7 up to about 10.

9. The process of claim 1 wherein the pH is decreased using sulfuric acid, acetic acid, citric acid, or any combination thereof.

10. The process of claim 1 which further comprises treating the aqueous phase with a carbon bed under conditions to remove at least a portion of BOD.

11. The process of claim 1 wherein separating comprises centrifuging, gravity separation, membrane separation, or any combination thereof.

12. The process of claim 11 which further comprises filtering solids prior to separating.

13. The method of claim 1 which comprises employing an EWCU capable of producing one or more electric fields.

14. The method of claim 13 wherein the heating is conducted prior introducing the lipid stream into the EWCU.

15. The process of claim 1 which further comprises converting the separated oil phase to a useful product.

16. The process of claim 15 wherein the useful product comprises a jet fuel, a biodiesel, a renewable diesel, a lubricant, a yellow grease, a soap, an animal feed, or a chemical feedstock.

* * * * *